United States Patent Office 3,600,229
Patented Aug. 17, 1971

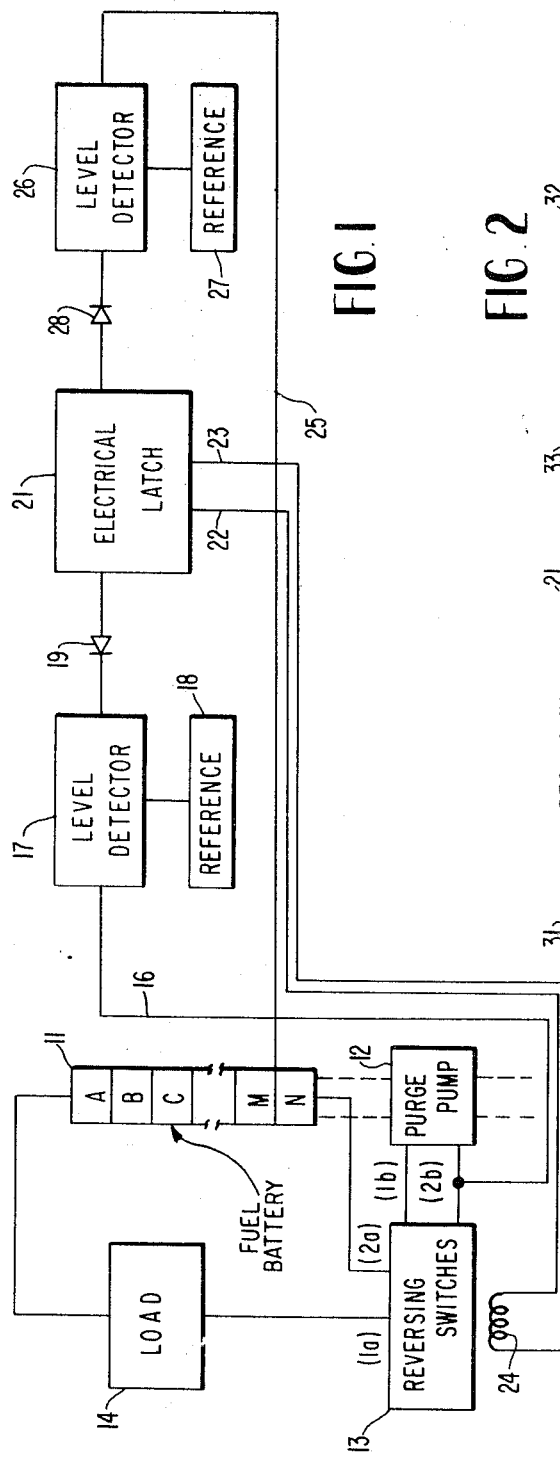
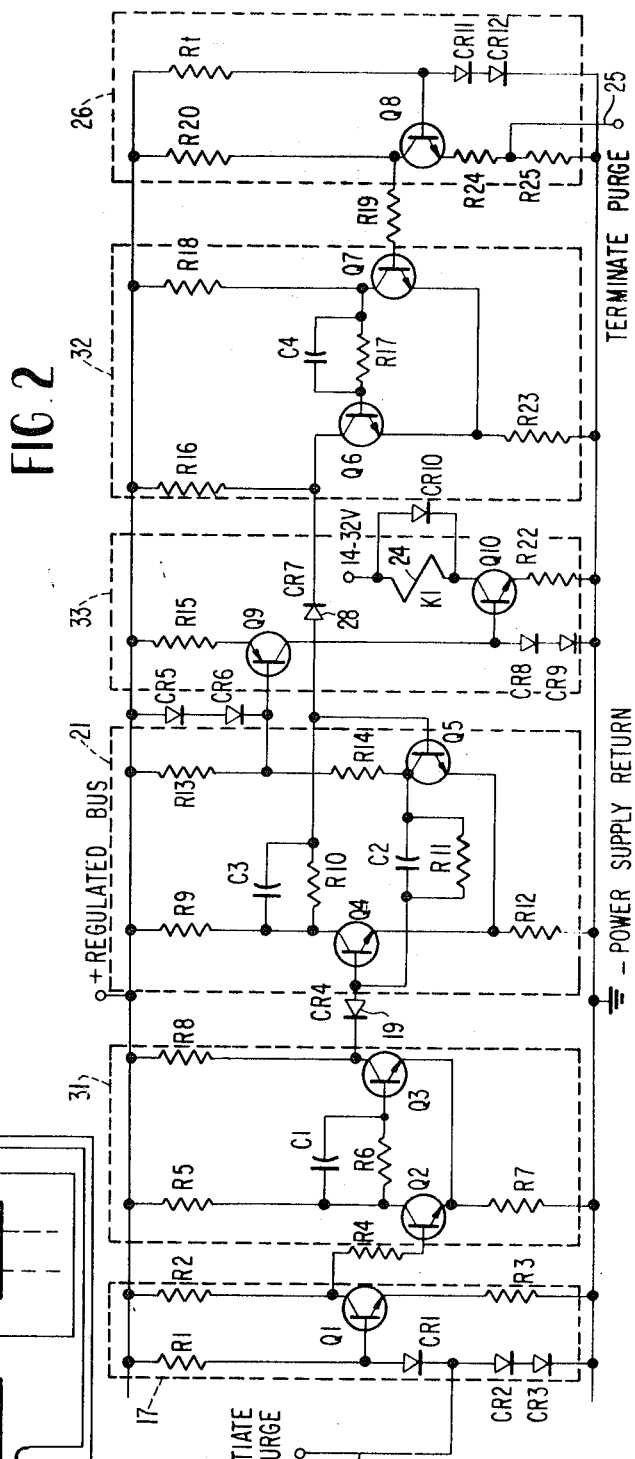

3,600,229
FUEL CELL AUTOMATIC PURGE SYSTEM PROVIDING RELIABLE INITIATION AND TERMINATION OF PURGING
Robert A. Torkildsen, Danvers, Mass., assignor to General Electric Company
Filed Nov. 29, 1968, Ser. No. 779,920
Int. Cl. H01m 27/12
U.S. Cl. 136—86                                6 Claims

ABSTRACT OF THE DISCLOSURE

A combined sensing and output power actuating control system for power generation assemblies of the fluid consuming cell type such as fuel cells and fuel batteries. The control system is designed to sense or detect build-up of undesired inert gaseous matter in the consumable and regenerable fluid supply system of such assemblies by sensing the need for purging of the consumable and regenerable fluid supply system. After some predetermined safe period of purging, the assembly will indicate the need for termination of the purging operation. A signal is then generated in response to the reduction in the inert concentration to actuate the purge control circuitry and terminate the purging operation.

BACKGROUND OF INVENTION

Field of invention

This invention relates to a new and improved control system for a device of the type having at least two operating conditions indicated by two different condition indicating signals that depart from predetermined reference level values.

More specifically, the invention relates to an electronic sensing and actuating purging control system for electric power sources of the fluid consuming cell type such as are exemplified by fuel cells and fuel batteries. The control system senses the build-up of undesired inert gaseous matter in at least one unit cell of the power source, and thereafter initiates a purging operation which is properly terminated after an appropriate purging period so as to purge the fuel cell system of the undesired inert gaseous matter and restore it to its full operating capability.

Description of prior art problems

Power sources of the fluid consuming cell type such as are exemplified by fuel cells and fuel batteries generally comprise an arrangement for circulating an electrochemically and regenerable fluid such as hydrogen past a first electrode structure. The hydrogen is electrochemically convertible into ionized form upon being brought into engagement with the first electrode structure which is capable of consuming and regenerating the hydrogen. A suitable electrolyte ionically connects the first electrode structure with a second electrode structure which is contacted by a reactant fluid such as air. The arrangement is such that the electrolyte provides ion transport between the first and second electrodes under proper temperature and pressure conditions, and generates electricity in the process. In a fuel battery system hydrogen is supplied to a chamber enclosing the first electrode structures of a number of different unit cells each of which further includes an associated electrolyte and ionically coupled second electrode structure. The hydrogen serially passes the first electrode structures of the several unit cells thus formed and the several cells are electrically interconnected in series circuit relationship with the electrical power generated by the entire fuel battery assembly being derived across the series connected unit cells. For a more detailed description of the construction and operation of such fuel cells and/or fuel batteries, reference is made to copending U.S. application Ser. No. 687,327, filed Dec. 1, 1967, entitled "System and Process for Selectively Diverting an Electro-Chemically Consumable and Regenerable Fluid," Clinton C. Christianson, inventor, assigned to the General Electric Company.

One of the problems encountered in the operation of fuel cells and fuel batteries of the above briefly described type, is the provision of suitable means for purging the hydrogen supply system of such assemblies of undesired accumulated inert gaseous matter produced or otherwise introduced into the hydrogen supply system during operation of the device. Should this undesired inert gaseous matter accumulate and become an appreciable portion of the hydrogen supply system inventory, the performance of the cell and/or battery deteriorates. Hence, it is necessary to purge the hydrogen supply system of this undesired inert gaseous matter at appropriate intervals during operation of the system. A number of automatic purging control circuits have been developed for the purpose of accomplishing suitable purging of the hydrogen supply system. Certain of these automatic controls provide for a predetermined timed interval of purging which is precalculated and preprogrammed, and hopefully accomplishes the required purging of the hydrogen supply system. However, with controls of this type, due to transient and ambient operating conditions, the precalculated and preprogrammed purging interval may be either inadequate or too prolonged for the operating conditions encountered. To obviate this problem, it has been proposed to sense the need for purging due to the build-up of an electric potential across one of the cells of the fuel cell or fuel battery system, and thereafter maintain purging for whatever interval of time is required to produce a second "need to terminate purging" signal automatically produced by the system as a result of the purging operation, and which provides a clear indication that an adequate purging operation has been conducted. Known systems of this type, however, have not been entirely satisfactory due to their failure to provide reliable initiation and clean-cut termination of the purging operation. To overcome this difficulty, the present invention was devised.

SUMMARY OF INVENTION

It is therefore a primary object of the present invention to provide a new and improved control system for use with power sources of the fuel cell and fuel battery type for sensing the need to initiate purging of the consumable and regenerable gas (hydrogen) supply system, for reliably initiating such purging and maintaining the purging operation until the need for purging no longer exists and/ or must be terminated in order to maintain safe operation of the overall power source assembly, for sensing the need to terminate purging, and thereafter reliably terminating the purging operation.

A further object of the invention is to provide a control system having the above characteristics wherein once the system initiates a purging operation, it latches itself into a purging mode so that reversion of the need for purging sensed condition to a non-need condition does not adversely affect the purging interval, and conversely, once the purging interval has been terminated, reversion of the need to terminate purging sensed condition to a non-need condition cannot serve to undesirably initiate a purging operation.

In practicing the invention, a combined sensing and output power actuating control system is provided for devices of the type having at least two operating conditions indicated by two different condition indicating signals that depart from predetermined reference level values. The control system comprises first sensing means having a first condition indicating signal applied thereto as an input for comparing the first input condition indicating signal to a reference value and deriving an output trigger signal in response to the first input signal deviating from the first reference value. Latching bistable means having two stable states of operation and first and second input terminals for controlling the state of operation thereof and having at least one output terminal are also provided. First isolating means are provided for coupling the output from the first sensing means to the first input terminal of the latching bistable means. Second sensing means are also provided having a second condition indicating signal applied thereto as an input for comparing the second input condition indicating signal to a second reference value and deriving a second output trigger signal in response to the second input signal deviating from the second reference value. Second isolating means serve to couple the output from the second sensing means to the second input terminal of the latching bistable means. The first and second isolating means preferably comprise properly poled first and second unidirectional conducting devices such as diode rectifiers for preventing reversion of the respective first and second sensing means to their non-triggered condition from adversely affecting the operating state of the latching bistable means. Desirably, an output means in the form of an output power amplifier for energizing the actuating winding of a relay is coupled to the output terminal of the latching bistable means and is controlled by the operating state of latching bistable means. Also, preferably first and second monostable wave-shaping trigger circuit means are interposed intermediate the outputs of the first and second sensing means and the respective first and second input terminal of the latching bistable means, preferably with the first and second isolating unidirectional conducting devices interposed between the outputs of the first and second wave-shaping trigger circuit means and the input terminal of the latching bistable means.

In the preferred embodiment of the invention, the combined sensing and output power actuating control system is intended for use for power generation assemblies of the fuel cell type wherein upon build-up of undesired inert gaseous matter in the hydrogen supply system of the assembly a first electric signal is derived which exceeds a first reference value and which indicates the need for purging of the hydrogen supply system of the fuel cell, and which, after a predetermined safe period of purging, a second electric signal is derived which is less than a second reference value and which indicates the need for termination of the purging operation. These first and second electric signals are then applied to the combined sensing and output power actuating control system as the first and second input condition indicating signals, respectively.

BRIEF DESCRIPTION OF THE DRAWINGS

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIG. 1 is a functional block diagram of a combined sensing and output power actuating control system constructed in accordance with the invention, and illustrates the manner in which the control system is employed in conjunction with a power generation assembly of the fuel cell type;

FIG. 2 is a detailed schematic circuit diagram of a preferred form of a new and improved combined sensing and output power actuating control system constructed in accordance with the invention.

DETAILED DESCRIPTION OF PREFERRED EMBODIMENT

FIG. 1 is a functional block diagram of an overall electric power source of the fuel battery type showing the source connected in electrical circuit relationship with an electrical load and with a novel combined sensing and output power actuating control system according to the invention. The fuel battery is shown at 11 and is comprised by a plurality of unit cells A, B, C . . . M, and N, the construction and operation of which is described more fully in the above referenced U.S. application Ser. No. 687,327—Christianson. It should be noted however that while the fuel battery system of the above referenced application is preferred, the control system comprising the present invention can be used with any type of fuel cell or fuel battery, or for that matter any form of electrical apparatus to be controlled wherein there are at least two operating conditions of the apparatus indicated by two different condition indicating signals that depart from predetermined reference level values. The fuel battery system comprised in part by the plurality of unit cells 11 also includes a purge-pump element shown at 12 which also may comprise a fuel cell. The purge pump 12 is located in the hydrogen supply system of the overall fuel battery as indicated by the dotted arrows, and because it also comprises a fuel cell, it includes first and second electrode means ionically coupled through a suitable electrolyte. The electrical output from the purge pump unit cell 12 is derived from the terminals (1b) and (2b) which are suitably interconnected with the electrical output of the series connected unit cells A, B, C, etc., comprising the fuel battery 11 by means of a reversing switch arrangement 13 across a load 14.

During normal operation of the power source comprised by elements 11 and 12, the purge pump fuel cell unit 12 is electrically connected so that in effect it operates as the last cell in the overall power source system, and hydrogen is supplied serially through an input chamber of the purge pump fuel cell unit 12, and thence serially through the several unit cells A, B, C, etc., of the battery system 11. The hydrogen which comprises an electrochemically consumable and regenerable fluid is partially consumed at each of the first electrode means of the several unit cells A, B, C, etc., of the battery system 11, and thence exhausted back through a second output chamber associated with the second electrode means of the purge pump unit cell 12. During normal operation, the reversing switches 13 are set such that the polarity of the electrical potential developed across the terminal leads (1b) and (2b) cause the second electrode means of purge pump unit cell 12 to consume whatever hydrogen is left in the supply fluid exhausted from the battery system 11, and to ionically couple the hydrogen ions back through the electrolyte to the first electrode means where the hydrogen is regenerated and supplied back to the input hydrogen stream as indicated by the dotted input arrows. The reversing switches 13 also serve to couple the electric potential appearing across the terminals (1b) and (2b) in series with the electric potential developed by the battery system 11, and to couple the total series voltage across the load 14. For a more detailed description of the construction and operation of the overall power source thus comprised, reference is made to the above-identified copending application Ser. No. 687,327—Christianson.

During operation of the fuel battery system shown in FIG. 1, undesired inert gaseous matter will be produced or otherwise introduced in the hydrogen supply system during operation of the power source. This inert gaseous matter will accumulate and tend to become an appreciable portion of the inventory of the output hydrogen supply cavity associated with the second electrode means of the purge pump unit cell 12. This build-up of undesired inert gaseous matter will result in the production of an increasing electric potential that appears across the output terminal (2b). This increasing electric potential in fact comprises a first condition indicating signal which indicates the need for purgng of the hydrogen supply system of the power source. This first condition indicating signal is supplied over a conductor 16 to the input of a first sensing circuit means comprised by a level detector 17. The level detector 17 serves to compare the first condition indicating signal supplied over conductor 16 to a first reference value derived from a reference source 18, and to derive an output trigger signal in response to the first input condition indicating signal deviating from the first reference value.

The first output trigger signal derived from level detector 17 is supplied through a first isolating means comprised by a diode rectifier 19 to a first input terminal of an electrical latch 21 comprised by a latching bistable circuit means having two stable states of operation and first and second input terminals for controlling the state of operation thereof and having at least one output terminal. The latching bistable circuit means 21 normally is in its second operating state whereby no output signal is produced at its output terminal. Upon being switched to its first operating state by the application of a first input trigger signal from level detector 17 through diode rectifier 19 to its first input terminal, an output signal is produced at its output terminal which is supplied over conductors 22 and 23 to an output means comprised by the actuating winding 24 of the relay control reversing switch whose contacts comprise the reversing switches 13.

It should be noted at this point that the electrical latch 21, which is comprised by a latching bistable circuit means possesses the characteristic of remaining in the last operating state to which it has been switched until such time that it is positively switched to its opposite operating state by the application of a second input signal to its second input terminal. Accordingly, once the electrical latch 21 has been switched to its first operating state so as to energize the actuating winding 24 of reversing switches 13, the latch will remain in its first operating condition until such time that it is positively switched back to its second operating condition by the application of a second input signal to its second input terminal. Consequently, even if the original first condition indicating signal supplied across conductors 16 from output terminal (2b) of the purge pump unit cell 12 drops below the first reference value established by level detector 17, this change in condition will be prevented from affecting the condition of electrical latch 21 by the diode rectifier 19 which blocks and hence isolates the electrical latch 21 from any further influence by the level detector 17 so long as it is in its first operating state. Hence, it will be appreciated that the diode rectifier 19 comprises a properly-poled first unidirectional conducting device for preventing reversion of the first sensing circuit means comprised by level detector 17 to its non-triggered condition from adversely affecting the operating state of the electrical latch 21.

Upon electrical latch 21 being switched to its first operating state whereby the actuating winding 24 is energized so as to reverse the connections of the reversing switch 13, the electric potentials developed at the terminals (1b) and (2b) are reversed in polarity so that in effect incoming hydrogen (or some other suitable electro-chemically consumable and regenerable fluid) is consumed at the first electrode means of the purge pump unit cell 12, and the hydrogen ions are ionically coupled or pumped from the first electrode means to the second electrode means where they are regenerated and serve to pump out or sweep out the undesired inert gaseous matter accumulated in the hydrogen supply chamber associated with the second electrode means. This mode of operation of the purge-pump unit cell 12 is also described more fully in the above referenced application Ser. No. 687,327—Christianson. The effect of the operation of the purge-pump unit cell 12 in the purging or pumping mode effectively is to short-circuit the hydrogen supply system through the purge-pump unit cell 12.

Due to the short-circuiting effect of the purge-pump unit cell 12 while it is operating in the purging or pumping mode as described briefly above, the remaining unit cells A, B, C, etc., of the fuel battery 11 become hydrogen starved. The last unit cell N is the first unit cell of fuel battery 11 to experience the effect of this hydrogen starvation, and as a consequence the electric potential developed across this last unit cell will begin to decrease rapidly. This decrease in electric potential of the last unit cell N is coupled across a conductor 25 as a second input condition indicating signal and supplied to the input of a second sensing circuit means comprised by a level detector 26. This second condition indicating signal supplied over conductor 25 indicates the need for termination of the purging operation in order to prevent the overall performance of the power source from becoming adversely affected as a consequence of the purging operation. This second condition indicating signal is compared to a second reference value derived from a second reference signal source 27 in the level detector 26. Level detector 26 then serves to derive a second output trigger signal in response to the second input condition indicating signal dropping below the second reference value.

This second output trigger signal derived by level detector 26 is coupled through a second isolating diode rectifier 28 to a second input terminal of the electrical latch 21. Upon application of the second input trigger signal to the second input terminal of electrical latch 21, it will automatically be switched from its first operating condition back to its second operating condition where normally it is maintained. As a consequence, the actuating winding 24 will be de-energized and the reversing switches 13 automatically will be returned to the previously described normal operating condition wherein the purge-pump unit cell 12 is connected as the last power generating unit cell of the overall power source, and hydrogen flows through the cell in the normal pattern indicated by the dotted arrows thereby restoring the fuel battery system to full operating capacity.

From the above brief description, it will be appreciated that the power source comprised by the battery system including purge-pump unit cell 12 normally operates through the reversing switches 13 to supply electric power to the load 14. However, as a normal consequence of continued operation, the build-up of undesired inert gaseous matter in the purge-pump unit cell 12 of the source will produce an increasing potential electric signal that is supplied across the conductor 16 to trigger level detector 17. Upon level detector 17 being triggered, it in turn will set the electrical latch 21 to the first one of its two operating states. Upon being switched to its first operating state, he electrical latch 21 functions to energize the actuating winding 24 of reversing switches 13 which then serve to switch the potentials across the purge pump unit cell 12 so that it commences to operate as a purge pump rather than a unit cell in the overall power source system. This results in short-circuiting the hydrogen or other electrochemically consumable and regenerable fluid so as to starve the other cells A through N of the system. The consequences of this hydrogen starvation are experienced to the greatest extent in the last unit cell N which then supplies a second condition indicating signal over the conductor 25 to the second level detector 26 which indicates the need to terminate purging. Upon this second condition indicating signal supplied over conductor 25 dropping below a second reference value, the second level detector 26 will switch the electrical latch 21 back to its second operating state where it normally is maintained. As a consequence of this action, the actuating winding 24 no longer will be energized and the reversing switches will again reconnect the purge pump unit 12 back into operation as a unit cell of the overall power source thereby restoring the system to its full operating capacity.

FIG. 2 of the drawings is a detailed schematic circuit diagram of a preferred form of combined sensing and output power actuating control system constructed in accordance with the invention. In the circuit shown in FIG. 2, in addition to the first and second sensing circuit means 17 and 26, respectively, and the latching bistable circuit means 21, first and second wave-shaping and amplifying circuits, shown at 31 and 32, are provided along with a power amplifier stage 33 which serves to amplify the output enabling potential developed by the latching bistable circuit means 21, and to apply this signal as an energizing current to the relay winding 24 that serves to actuate the reversing switches 13.

During operating periods while the fuel battery system is fully operative, the first condition indicating signal applied over conductor 16 and used to indicate the need to initiate purging, will be at a high level compared to the reference value established by the sensing circuit 17. Under these same conditions, the second input condition indicating signal used to indicate the need to terminate purging applied over the conductor 25 is at a low value compared to the second reference signal established by the second sensing circuit means 26 and its associated reference level establishing circuitry. Consequently, the latching bistable circuit means 21 will be latched in its second operating or de-energized state whereby no output signal appears at its output terminal and the relay winding 24(K1) is de-energized. As the fuel cell system continues to operate, the "initiate purge" signal supplied over conductor 16 increases in value until sufficient current flows through the transistor Q1 to render it conductive to an extent above a reference level established by the values of the resistor R2 and R3 and the base electrode biasing circuit comprised by resistor R1 and diode rectifiers CR1 through CR3. Upon transistor Q1 being rendered conductive above the reference level its lowered collector potential will be applied through the resistor R4 to the base electrode of transistor Q2.

Transistor Q2 and transistor Q3 are interconnected through the medium of resistors R5 through R8 and capacitor C1 in a well known Schmitt trigger configuration so that the circuit has only one stable state of operation whereby Q2 is maintained on and to which it automatically will revert in the absence of a negative potential on the collector of transistor Q1.

The circuit performs a wave-shaping and amplifying function, and is adjusted so that the transistor Q2 normally is conductive. As a consequence of the common emitter-resistor R7, transistor Q3 will be maintained in an off condition until such time that transistor Q2 is turned off. Upon transistor Q1 being turned on by the increase in value of the "initiate purge" signal supplied over conductor 16, transistor Q2 will be turned off. As transistor Q2 starts to turn off, due to regenerative cross coupling, transistor Q3 turns on almost instantaneously resulting in the production of a sharp, amplified negative going first trigger signal pulse at its collector terminal.

The first trigger signal pulse appearing at the collector of transistor Q3 in the wave-shaping and amplifying circuit means 31 is supplied through diode rectifier 19 to the base electrode of a transistor Q4 and to the collector of a transistor Q5 in the latching bistable circuit means 21. The transistors Q4 and Q5 are connected in a bistable circuit configuration through the medium of the resistors R9 through R14 and capacitors C2 and C3. Consequently, upon the application of the first trigger signal pulse to the base of transistor Q4 and collector of transistor Q5, the circuit operates regeneratively to switch from its normal first operating state wherein transistor Q4 is maintained on and transistor Q5 is maintained off, to its second stable operating state wherein transistor Q5 is maintained on and transistor Q4 is turned off. It should be noted at this point that the latching bistable circuit means 21 will be maintained in this second operating state irrespective of further signal pulses that might be supplied to it from the first sensing circuit means 17 and wave-shaping and amplifying circuit 31 due to the polarity of connection of the diode rectifier 19. Thus, even if the "initiate purge" signal supplied across conductor 16 drops below the predetermined reference level, and first sensing circuit 17 and wave-shaping circuit 31 revert to their normal operating condition whereby transistor Q3 is turned off, the polarity of connection of diode rectifier 19 will prevent the latching bistable circuit 21 from being adversely affected thereby assuring positive and reliable initiation and continuation of a purging operation.

Turn-on of transistor Q5 results in the production of a negative going trigger signal on its collector which is coupled to the base electrode of a PNP transistor Q9. PNP transistor Q9 comprises one stage of a two-stage power amplifying circuit 33 which is further comprised by an NPN transistor Q10 that supplies energizing current to the relay winding 24(K1). The amplified negative going signal pulse supplied to the base of the PNP transistor Q9 results in turning this transistor on, and in turning on NPN transistor Q10 so as to supply energizing current to the relay winding 24. Due to the latching characteristic of the bistable latching circuit means 21, the control circuit will be maintained in this on condition for so long as purging is required.

As the purge progresses, the second input condition indicating signal which indicates the need to terminate purging, and which is applied across the conductor 25 to the emitter of a transistor Q8 in the level detector 26 which comprises the second sensing circuit means, will slowly fall off. At some predetermined point established by the value of resistors R20, R24, R25, R$f$ and diodes CR11 and CR12, the potential of the collector of transistor Q8 will be reduced sufficiently to increase the conduction of transistor Q8 above the predetermined second reference level. This results in the production of a negative going trigger signal that is supplied through resistor R19 to the base of transistor Q7 in the second wave-shaping and amplifying circuit means 32.

Transistor Q7 is an NPN transistor and is connected in a monostable Schmitt trigger circuit configuration with a second NPN transistor Q6 through the medium of the resistors R16 through R18, R23 and capacitor C4. The application of a negative going trigger signal to the base electrode of transistor Q7 operates regeneratively to quickly switch the wave-shaping and amplifying circuit 32 from a first normal operating mode (to which it automatically will revert in the absence of a negative trigger signal on the base of Q7) wherein transistor Q7 is conducting to a second triggered operating mode wherein transistor Q6 is conducting and transistor Q7 is maintained off. This results in the production of a sharp, negative going second trigger pulse on the collector of the transistor Q6.

The negative going second trigger pulse produced at the collector of transistor Q6 is supplied through diode rectifier 28 to the base electrode of transistor Q5 and to the collector electrode of transistor Q4 of the latching bistable circuit means 21. This results in turning transistor Q5 off and transistor Q4 on. Due to its latching characteristics, the circuit thereafter will be maintained in this off condition until such time that another "initiate purge" condition indicating signal is supplied to the control system across the first input conductor 16.

Upon transistor Q5 being turned off, PNP transistor Q9 in the output power amplifying circuit 33 will be turned off and results in turning off transistor Q10 which in turn results in de-energizing the relay winding 24. Thereafter, the relay winding 24 will remain in the de-energized state until such time that the need for purging is again indicated. This is true even though the signal applied across conductor 25 increases to a value in excess of the reference level thereby turning on Q8 and allowing wave-shaping and amplifying circuit 32 to revert to its normal operating mode wherein Q7 is conducting. Upon this occurrence, isolating diode 28 prevents latching bistable circuit 21 from switching states. At the initial startup of the power source system, the low level of the terminating purge signal supplied over conductor 25, will cause the control system automatically to drop out the purge relay and latch in this position ready for the start of the fuel cell operation as described above.

From the foregoing description, it will be appreciated that the present invention provides a new and improved control system for use with power sources of the fuel cell and fuel battery type for sensing the need to initiate purging of the consumable and regenerable gas (hydrogen) supply system of the power source, for reliably initiating such purging and maintaining the purging operation until the need for purging no longer exists and/or must be terminated in order to maintain safe operation of the overall power source assembly, for sensing the need to terminate purging, and thereafter reliably terminating the purging operation. In addition to these characteristics, once the system initiates a purging operation, it latches itself into a purging mode of operation so that reversion of the need for purging sensed condition to a non-need condition does not adversely affect the purging interval, and conversely, once the purging interval has been terminated, reversion of the need to terminate purging sensed condition to a non-need condition cannot serve to undesirably initiate a purging operation.

Having described one embodiment of a combined sensing and output power actuating control system constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

What is claimed is:

1. A combined sensing and output power actuating control system for power generation assemblies of the fluid consuming cell type wherein upon build-up of undesired inert gaseous matter in the electro-chemically consumable and regenerable fluid supply system of the assembly a first electric signal is derived which exceeds a first reference value and which indicates the need for purging of the electro-chemically consumable and regenerable fluid supply system and after a predetermined safe period of purging a second electric signal is derived which is less than a second reference value and which indicates the need for termination of the purging operation, said control system comprising first sensing circuit means having a first need to initiate purging condition indicating signal applied thereto as an input for comparing the first input condition indicating signal to a first reference value and deriving an output trigger signal in response to the first input signal deviating from the first reference value including wave shaping means, latching bistable circuit means having two stable states of operation and first and second input terminals for controlling the state of operation thereof and having at least one output terminal, first isolating means for coupling the output from said first sensing circuit means to the first input terminal of said latching bistable circuit means, second sensing circuit means having a second need to terminate purging condition indicating signal applied thereto as an input for comparing the second input condition indicating signal to a second reference value and deriving a second output trigger signal in response to the second input signal deviating from the second reference value, and second isolating means for coupling the output from the second sensing circuit means to the second input terminal of the latching bistable circuit means.

2. A control system according to claim 1 further including output power amplifier means coupled to the output terminal of the latching bistable circuit means, and the actuating winding of a purge control relay coupled to the output of the output power amplifier means.

3. A control system according to claim 1 wherein the first and second isolating means comprise properly-poled first and second unidirectional conducting devices for preventing reversion of the respective first and second sensing circuit means to their non-triggered condition from adversely affecting the operating state of the latching bistable circuit means.

4. A control system according to claim 1 further including wave-shaping and amplifier circuit means disposed intermediate the outputs of the first and second sensing circuit means and the input terminals of the latching bistable circuit means.

5. A control system according to claim 1 wherein the first and second isolating means comprise properly-poled first and second unidirectional conducting devices for preventing reversion of the respective first and second sensing means to their non-triggered condition from adversely affecting the operating state of the latching bistable means, and further including output power amplifier circuit means coupled to the output terminal of the latching bistable means for driving the actuating winding of a relay, and first and second monostable wave-shaping and amplifier circuit means interposed intermediate the outputs of the first and second sensing circuit means and the respective first and second unidirectional conducting devices.

6. A control system according to claim 5 wherein the first and second sensing means comprise first and second biased transistor amplifier circuits whose operating conditions are changed by the first and second input signals, respectively, the first and second wave-shaping and amplifier circuit means comprise first and second Schmitt trigger circuits having the inputs thereof coupled to the outputs from the first and second sensing transistor amplifier circuits, the first and second isolating unidirectional conducting devices comprise oppositely-poled diode rectifiers, and the latching bistable circuit means comprises a third bistable Schmitt trigger circuit having first and second inputs connected to the first and second isolating diode rectifiers.

References Cited
UNITED STATES PATENTS

| | | | |
|---|---|---|---|
| 3,256,116 | 6/1966 | Justi et al. | 136—86(B) |
| 3,300,689 | 1/1967 | Beddoes | 317—148.5 |
| 3,317,348 | 5/1967 | Winsel | 136—86(B) |
| 3,336,595 | 8/1967 | Barany | 307—292X |
| 3,435,257 | 3/1969 | Lawrie, Jr. | 307—292X |

J D MILLER, Primary Examiner

A. D. PELLINEN, Assistant Examiner

U.S. Cl. X.R.

317—148.5; 323—19